(12) United States Patent
Bruder, III et al.

(10) Patent No.: US 11,648,085 B2
(45) Date of Patent: May 16, 2023

(54) ENDODONTIC SYSTEM AND INSTRUMENT FOR IRRIGATION AND DISINFECTION OF A TOOTH ROOT CANAL

(71) Applicant: George Anthony Bruder, III, Palm Beach Gardens, FL (US)

(72) Inventors: George Anthony Bruder, III, Palm Beach Gardens, FL (US); Vince Shotton, Broken Arrow, OK (US); Kevin Wilkinson, Bixby, OK (US); Sveva Crivelli, Neuchâtel (CH)

(73) Assignee: George Bruder, Palm Beach Gardens, FL (US)

( * ) Notice: Subject to any disclaimer, the term of this patent is extended or adjusted under 35 U.S.C. 154(b) by 259 days.

(21) Appl. No.: 16/344,546

(22) PCT Filed: Oct. 24, 2017

(86) PCT No.: PCT/US2017/058162
§ 371 (c)(1),
(2) Date: Apr. 24, 2019

(87) PCT Pub. No.: WO2018/081180
PCT Pub. Date: May 3, 2018

(65) Prior Publication Data
US 2019/0290397 A1    Sep. 26, 2019

Related U.S. Application Data

(60) Provisional application No. 62/411,815, filed on Oct. 24, 2016.

(51) Int. Cl.
*A61C 5/50* (2017.01)
*A61C 5/42* (2017.01)
(Continued)

(52) U.S. Cl.
CPC .............. *A61C 5/50* (2017.02); *A61C 5/42* (2017.02); *A61C 17/024* (2019.05); *A61C 1/0046* (2013.01); *A61C 1/055* (2013.01)

(58) Field of Classification Search
CPC .......... A61C 5/42; A61C 5/50; A61C 17/024; A61C 1/0046; A61C 1/055;
(Continued)

(56) References Cited

U.S. PATENT DOCUMENTS 4,019,254 A * 4/1977 Malmin ................ A61C 3/03
433/102
5,197,880 A * 3/1993 Lovaas ................ A61C 5/42
433/102
(Continued)

FOREIGN PATENT DOCUMENTS

DE    102006007316 A1    8/2007
EP        2438884 A1    4/2012
(Continued)

OTHER PUBLICATIONS

International Search Report and Written Opinion of the International Searching Authority for International Application No. PCT/US2017/058162 dated Jun. 25, 2018.

*Primary Examiner* — Edward Moran
*Assistant Examiner* — Matthew P Saunders

(57) ABSTRACT

A dental instrument for use with a dental handpiece cleans and disinfects tooth root canals. The instrument includes a shaft and connector for releasable attachment to the handpiece, the shaft including at least a tip end, a distal portion approximate to the connector, and at least two radial protrusions extending along length of the shaft with a longitudinal groove extending between the at least two radial protrusions.

11 Claims, 7 Drawing Sheets

S Shaped Irrigator with Protrusions

(51) Int. Cl.
*A61C 1/00* (2006.01)
*A61C 17/024* (2006.01)
*A61C 1/05* (2006.01)

(58) Field of Classification Search
CPC ...... A61C 5/40–42; A61B 18/20; A61N 5/06; A61N 5/0601; A61N 5/0603; A61N 5/0619; A61N 5/0624; A61N 2005/0602; A61N 2005/063; A61N 2005/0666; A61N 2005/0606; A61N 2005/0612
USPC .......................................................... 433/224
See application file for complete search history.

(56) References Cited

U.S. PATENT DOCUMENTS

| | | | | |
|---|---|---|---|---|
| 5,503,559 | A * | 4/1996 | Vari | A61B 5/0088 433/102 |
| 5,897,314 | A * | 4/1999 | Hack | G02B 6/262 433/29 |
| 5,968,039 | A * | 10/1999 | Deutsch | A61B 18/24 606/10 |
| 6,418,252 | B1 * | 7/2002 | Maitland | G02B 6/0008 385/31 |
| 6,520,774 | B1 | 2/2003 | Mays | |
| 6,575,748 | B1 | 6/2003 | Filhol | |
| 6,916,329 | B1 * | 7/2005 | Zhao | A61N 1/0502 606/189 |
| 7,040,892 | B2 * | 5/2006 | Hirszowicz | A61C 5/40 433/29 |
| 7,306,459 | B1 * | 12/2007 | Williams | A61N 5/0601 433/29 |
| 8,002,544 | B2 * | 8/2011 | Rizoiu | A61C 5/40 433/29 |
| 8,221,117 | B2 * | 7/2012 | Rizoiu | A61C 19/06 433/81 |
| 10,130,444 | B1 * | 11/2018 | Heath | A61C 5/42 |
| 2005/0281530 | A1 * | 12/2005 | Rizoiu | A61B 18/26 385/146 |
| 2006/0085052 | A1 * | 4/2006 | Feuerstein | A61L 2/0082 607/90 |
| 2007/0225695 | A1 * | 9/2007 | Mayer | A61N 5/062 606/15 |
| 2009/0042171 | A1 * | 2/2009 | Rizoiu | A61C 5/40 433/224 |
| 2009/0130622 | A1 * | 5/2009 | Bollinger | A61C 1/0046 433/29 |
| 2009/0176188 | A1 * | 7/2009 | Tobis | A61C 3/02 433/102 |
| 2009/0220908 | A1 * | 9/2009 | Divito | A61C 5/40 433/29 |
| 2009/0258330 | A1 * | 10/2009 | Huber | A61C 5/40 433/224 |
| 2010/0040994 | A1 * | 2/2010 | Johnson | A61C 5/42 433/132 |
| 2010/0047734 | A1 * | 2/2010 | Harris | A61C 1/0046 433/29 |
| 2013/0084545 | A1 * | 4/2013 | Netchitailo | A61L 2/02 433/224 |
| 2013/0171581 | A1 | 7/2013 | McCafferty et al. | |
| 2013/0260334 | A1 | 10/2013 | Pernot et al. | |
| 2014/0302454 | A1 | 10/2014 | Maxwell et al. | |
| 2018/0049853 | A1 * | 2/2018 | Liang | A61C 1/0046 |
| 2019/0159867 | A1 * | 5/2019 | Bruder | A61C 3/03 |

FOREIGN PATENT DOCUMENTS

EP 3001973 A1 4/2016
FR 2935260 A1 * 3/2010 .............. A61C 5/42

* cited by examiner

S Shaped Irrigator

Small S Shaped Irrigator

S Shaped Coronal Irrigator

Small and Large S Irrigator Overlay

S Shaped Irrigator with Protrusions

S Shape Irrigator with Angled Protrusions

S Shaped Irrigator with Interrupted Protrusions

Spiral Shaped Irrigator

S and Spiral Shaped Irrigator Overlay

Handpiece with contra angle and
S Shaped Irrigator installed

Handpiece with contra angle and
S Shaped Irrigator installed

Handpiece with S Shaped Irrigator
rotating at ~ 10,000rpm

Example Handpiece with integrated red laser
with light exiting from the tip

ENDODONTIC SYSTEM AND INSTRUMENT FOR IRRIGATION AND DISINFECTION OF A TOOTH ROOT CANAL

THE CROSS-REFERENCE TO RELATED APPLICATIONS

The present application is a National Stage of International Application No. PCT/US2017/058162, filed Oct. 24, 2017, which claims the benefit of and priority to U.S. Provisional Patent Application Ser. No. 62/411,815, filed on Oct. 24, 2016, which is herein incorporated by reference for all purposes.

FIELD OF INVENTION

This invention relates to a system used for the irrigation and disinfection the root canal.

BACKGROUND OF THE INVENTION

Following tooth maturation, the dental pulp is harbored within the structural elements of the tooth. Frequently, and for a variety of reasons, the pulp is irreversibly injured, resulting in inflammatory and infectious conditions which often adversely affect the tooth, its supporting structures, and the patient's health. Clinically, as an alternative to extraction, root canal treatment is performed and ideally directed towards the elimination of pulp, bacteria, and related irritants from the root canal system, followed by three-dimensionally filling the root canal space with an inert, biocompatible, dimensionally stable, filling material, such as gutta percha. Ideally, the obturation procedures will fill not just the main canal, but the fins, webs, cul-de-sacs, lateral canals, and all portals of exit between the root canal system and the tooth's attachment apparatus.

Root canal procedures are common. Central to a successful endodontic treatment has been the use of chemical reagents during mechanical root canal shaping procedures to completely clean all aspects of the root canal system. The chemicals used to enhance canal debridement and disinfection during cleaning and shaping procedures potentially reach all aspects of the root canal system. The most popular chemicals currently used during canal preparation to actively assist in cleaning and disinfecting include bleach, hydrogen peroxide, and chelating agents. Often, a 2%-5% solution of a clear, pale, greenish-yellow strongly alkaline solution of sodium hypochlorite (NaOCl) and ethylenediaminetetracetic acid (EDTA) are used.

During canal preparation, a solution of NaOCl is liberally irrigated into the root canal space where its solvent action facilitates the digestion and removal of pulp, bacteria, viruses, spores, endotoxins and other irritants generated by the microorganisms. This solution has the potential to circulate, penetrate and, hence, clean into all aspects of the root canal space. However, studies have shown that even the most thorough use of sodium hypochlorite does not remove all the material from the root canal. The walls of a root canal are comprised of dentin, which contains millions of dentinal tubules per square millimeter. Instruments used to negotiate and shape a canal cut dentin and dentin, in combination with organic substrates, forms dentinal mud. Dentine mud, pulp, bacteria, and other related irritants have been consistently visualized histologically after cleaning and shaping procedures in the dentinal tubules and various aspects of the root canal systems. Thus, after cleaning and shaping procedures, the root canal is still covered with a film of debris, frequently described in the literature as a "smear layer." This "smear layer" includes dentinal mud and/or organic debris, including the irritants noted above.

After cleaning and shaping, the root canal has been traditionally filled with gutta percha and a root sealer. However, if the smear layer or film is not adequately removed from the root canal, the smear layer can compromise the filling and sealing of the root canal system. If obturation is incomplete then the root canal space is predisposed to bacterial leakage and failure. Post-treatment failures attributable to leakage are common and require endodontic retreatment of the tooth or extraction. Thus, for a complete and thorough cleaning, this smear layer or film should be removed. To address the smear layer, practitioners use a weak acid or surfactant, such as 17% EDTA, in an effort to remove the smear layer. Typically, the root canal is flushed with EDTA, or other similar reagents, to accomplish this. Traditionally, some practitioners have used a metal root canal file or a cannula to activate the solution and enhance the performance of the EDTA. These devices may be used manually or mounted in an ultrasonic handpiece to produce vibrations and fluid movement. As an example, even when a file is used, it is impossible to ensure that the file is brought into contact with the complete surface of the root canal, and hence it is difficult to ensure that substantially all of the smear layer has been removed. Regrettably, the use of ultrasonically driven metal instruments has frequently led to iatrogenic events, such as broken instruments, ledges in the wall of the root canal preparation, or even perforation of the root canal.

SUMMARY OF THE INVENTION

The system may include a driver (motor) and tip used for cleaning and disinfection of the root canal in endodontic procedures.

The apparatus of the system can drive the tip in rotary only, rotary with a reciprocating vertical motion, rotational reciprocating only, or rotational reciprocation with a reciprocating vertical motion. The apparatus is hand-held and the rotary motion can be powered by pressurized air or electrical. The rotary speed can be from 5,000 to 60,000 to increase the fluid velocity in the canal and the sheer stress at the root canal wall.

The apparatus can use rechargeable batteries or powered from electrical mains or other means of driving the rotation such as air.

The system can include light excitation sources for visual enhancement and also wavelengths used in photo-dynamic therapy. For example, red light from LEDs or laser diodes are incorporated into the body of the handpiece and taken to the head of the handpiece via light guides or fiber optics. The light can then be routed into the back of the rotating tip and the light travels through the tip material and exits through the surface of the material into the root canal and the PDT solution. Losses can be minimized with the appropriate optical coupling materials, however the amount of power is low so the waste heat is low and will not impact the product integrity. Another embodiment is the light exits from the front head of the device, adjacent to the tip connection, and is aimed parallel to the tip so that a large portion of the light enters into the canal. While the initial light level will need to be higher due to some higher fraction of light not captured in the canal, the advantage of this design is to reduce the complexity of the connection between the tip and handpiece. Another embodiment is the light exits from the front head of the device and is directed to the pulpal floor of the tooth and, after entering the tooth material, is diffracted in many directions but also into the root canal and PDT solution. While this increases the initial power level to another level, this again simplifies the overall design.

Other excitation wavelengths can include IR or UV as other embodiments. White light for visual enhancement of the pulpal floor and root canal is also included.

The system can also provide a continuous flow of irrigant either through the tip or via a port from the unit, handpiece used to connect to the tip, or by other means.

The tip can be made from a variety of flexible materials but a key element is its curved shaped so that, when in the canal, it can compress to adapt to smaller or non-round canals, but will flex to a larger local diameter so that it either brushes the canal walls to increase the velocity of the cleaning and disinfecting fluids to the canals walls. Continuous and non-continuous tabs and protrusions are used along the shaft of the irrigator to increase dynamic flow and shear wall stresses to promote cleaning and biofilm removal.

The tip material is also chosen based upon the light needed for the canal. Many plastics transmit red and blue light, but for scenarios where UV or IR wavelengths are required, there are materials such as UVT, ultraviolet transmitting, acrylics and IRT, IR transmitting, plexiglass.

The tip may also be a tube instead of solid. In this embodiment, the tip can be metal or plastic.

Various tip lengths are designed to support the different root canal lengths. This typically is 15 to 31 mm, however tips could range from 10 mm to 40 mm in extreme cases.

The tip size is small enough to reach the apical third of the canal and be either tapered or non-tapered. Furthermore, different tip sizes can be made to accommodate different types of anatomy. For instance, a smaller tip size, i.e. 0.20 mm, can be used for smaller canals typically seen in molars. The maximum size of the tip is mitigated by the curve in the tip. Normally the tip size may approach 1.0 mm towards the proximal end for larger canals. For this invention, the curvature of the tip is designed to allow the tip to sweep the larger diameter portions of the teeth root canals while keeping the shaft diameter of tip less than ~0.80 mm. The maximum diameter of the shaped portion of the tip could be as large as 1.2 mm. Various curve radiuses, as shown in FIG. 4 are designed to optimize cleaning of the canal.

The tip edges, as opposed to shaping files, are not cutting edges as the goal is to clean and disinfect the canal, not enlarge it.

The tabs and protrusions on the tips are sized and shaped to disrupt and direct the liquid flow so that higher velocities and shear wall stresses occur and help remove biofilm and smear layer. These protrusions may be angular shaped like a "V", cup shaped like a "C" or other embodiments. The location placement can be along the entire length of the tip or only locally, i.e. the inside of the tip curve. In a preferred embodiment, the maximum height of the protrusions may be no greater than the maximum radius of the curve of the tip or about 0.4 mm. However, smaller and larger protrusion lengths are contemplated by the present invention as discussed herein.

This invention may include one or more of the following:
1) Flexible rotating tips
a) that adapts to the canal, both compressing to smaller canals and expanding to contact larger diameter canal walls.
b) with protrusions such as fins, tabs. Longitudinally down the tip; this can be in various configurations such as diagonals, diamonds, helixes.
2) Flexible rotating tips with abrasive material in and on the surface of the material to support smear layer removal.

The present invention may include one or more of the following tips' motion:
1) could be only one direction of rotation;
2) could be reciprocating rotation;
3) could be at rotating at RPMs between 5,000 and 20,000 but preferably 10,000-12,000;
4) could also include vertical reciprocating motion at the same time as the rotation or independently of the rotation.

Size:
The tips can be manufactured with diameters (constant or variably tapered) greater than 0.20 mm or smaller (e.g., greater than 0.1 mm, preferably greater than at least 0.15 mm), so they are placed and mixing can be as deep in the root canal as necessary.

The tips are all used in the presence of an irrigant (NaOCL, EDTA, QMix, SyAction solutions, water).

Various embodiments of the tips:
The tip may include one or more of the following:
a) is flexible, compressible and expandable and can sweep to the outer diameter of the canal as well as compress to a smaller section of the same canal; this is opposed to rotating in one position with only limited fluid motion immediately adjacent to the outer diameter of a tip;
b) will be manufactured as small as 0.25 mm so that agitation and mixing of the solution occurs all the way down the canal;
c) can include protrusions, fins and tabs, longitudinally down the tip to stir and mix the solution in the canal;
d) shape can be a curved S-shape in a single plane, a spiral in more than one plane, or other combinations of curves that configure the tip in a maximum diameter dimension that allows contact with the root canal walls up to 1 mm and can compress as small as 0.20 mm diameter.
e) can also be used in n reciprocating motion; and/or
f) can be made of any material that is flexible enough to go down curved canals but stiff enough axially to be placed down the entire length of the canal. Materials include plastics, soft metals, non-metal with impregnated abrasives throughout or on the surface, metal-injection-molded material.

This invention cover tips that increase the total energy and areas of energy direction inside of the canal to promote equal or better disinfection compared to the above items and at a cost-effective price. The tips can expand or compress to the shape of the canal instead of being a fixed diameter at a fixed axial length. Also by rotating instead of being a oscillating in a single plane the tip sweeps fresh irrigant around the entire inner surface of the canal and into tubules.

In a first aspect, the present invention provides a dental instrument for use with a dental handpiece for cleaning and disinfecting of tooth root canals, the instrument including a shaft and connector for releasable attachment to the handpiece, the shaft comprising: a tip end; a distal portion approximate to the connector; at least two radial protrusions extending along length of the shaft with a longitudinal groove extending therebetween.

In another aspect, the present invention provides a dental instrument for use with a dental handpiece for cleaning and disinfecting of tooth root canals, the instrument including a shaft and connector for releasable attachment to the handpiece, the shaft comprising: a tip end; a distal portion approximate to the connector; and at least two offset portions being radially displaced from an axis of rotation about one plane.

In another aspect, the present invention provides a dental instrument for use with a dental handpiece for cleaning and disinfecting of tooth root canals, the instrument including a shaft and connector for releasable attachment to the handpiece, the shaft comprising: a tip end; a distal portion approximate to the connector; and at least two offset portions being radially displaced from an axis of rotation about at least two planes.

In yet another aspect, the present invention may include one or more of the following features: wherein the shaft includes a core having a surface, the radial protrusions extending from the surface of the core a free end. wherein at least one of the at least two radial protrusions taper towards the free end; wherein the at least two radial protrusions have a length extending between the surface of the core and the free end ranging from about 0.01 mm to about 2 mm; wherein the at least two radial protrusions have a length extending between the surface of the core and the free end ranging from about 0.01 mm to about 1 mm; wherein the at least two radial protrusions have a length extending between the surface of the core and the free end ranging from about 0.1 mm to about 0.5 mm; wherein the at least two radial protrusions have a length extending between the surface of the core and the free end that varies along the length of the shaft; wherein the at least two radial protrusions is at least four radial protrusions; wherein the four radial protrusions extending along the length of the shaft are separated by longitudinal grooves; wherein the core includes at least one offset portion being radially displaced from the axis of rotation; wherein the core includes at least two offset portions being radially displaced from the axis of rotation; wherein the at least two offset portion are radially displaced from the axis of rotation about one plane; wherein the at least two offset portion are radially displaced from the axis of rotation about at least two planes; wherein at least one of the at least two radial protrusions includes at least two intermittent radial protrusions having a spacing therebetween along the length of the at least one of the at least two radial protrusions along the length of the shaft; further comprising at least one radial protrusion extending along length of the shaft; further comprising at least two radial protrusions extending along length of the shaft with a longitudinal groove extending therebetween; further comprising at least one radial protrusion extending along length of the shaft; further comprising at least two radial protrusions extending along length of the shaft with a longitudinal groove extending therebetween; wherein the shaft is hollow and includes an internal pathway extending from the tip to the distal portion of the shaft; and any combination thereof.

BRIEF DESCRIPTION OF DRAWINGS

These figures illustrate only specific embodiments of the invention.

DETAILED DESCRIPTION OF THE INVENTION

Figure 1:
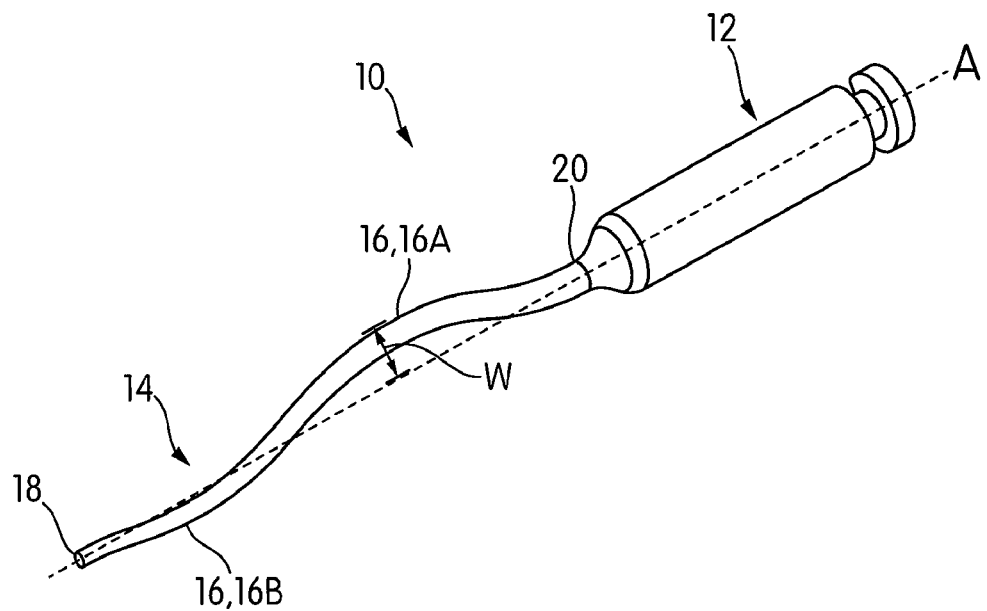
FIG. 1 is a perspective view of a first embodiment of the present invention extending along two planes.

In the following, the invention is described based on the non-exclusive, illustrative embodiments shown in the Figures. In the embodiments, identical components are designated with identical reference numerals.

The dental instrument 10 (such as an irrigator), shown in the embodiments, include a connection 12 (e.g., handle) at its end portion, which can be releasably attached to a head 40 of a dental handpiece 42 in the usual manner. Further, the dental instrument 10 comprises a shaft 14 which has a substantially circular cross-section and includes at least one curve 16 bent in a suitable manner.

A tip 18 is formed at the end of the shaft 14, which may have a smaller cross-section than the distal portion 20 of the shaft 14 proximate to the connection 12. Desirably, the shaft 14 tapers from the distal portion 20 to the tip 18 of the shaft 14. It is appreciated that the shaft 14 may have a constant taper or a variable taper. However, the shaft 14 may have no taper. For example, it is appreciated that the diameter may be reduced so that the shaft portion includes greater than about 0% taper, preferably from about 1% to about 10% taper, and most preferably from about 2% to about 6% taper.

Preferably, though not required, crest displacement distance (radial width W) decreases from one offset portion 16A to another offset portion 16B the closer the offset portion may be relative to the tip 18 of the shaft 14. For example, the first crest displacement distance 16A may be greater than the second crest displacement distance 16B, which may be greater than the third crest displacement distance (not shown). However, it is appreciated than the crest displacement distance may vary from one offset portion to another offset portion or may be the same. Furthermore, it is appreciated that the crest displacement distance may increase or decrease from one offset portion to another offset portion independent of the location of the offset portion relative to the tip 18, the proximal end 20 of the instrument 10, one or more adjacent offset portions, and/or otherwise. The offset portion being defined by a portion of the shaft being radially displace from the axis of rotation. It is appreciated that in a 2D embodiment, the offset portion may be defined by the length of the core being displaced from the rotation of axis A between a first point of intersection (inflection point) between a first portion of the core of the shaft and a first portion of the axis of rotation and a second point of intersection between a second portion of the core of the shaft and a second portion along the axis or rotation.

It is appreciated that the shaft 14 may be displaced from the rotation axis A along the offset portion 15 in an amount greater than about 0.0 mm, preferably greater than about 0.05 mm, and more preferably greater than 0.5 mm. Furthermore, it is appreciated that the shaft 14 may be displaced from the rotation axis A along the offset portion 15 in an amount less than about 7 mm, preferably less than about 6 mm, and more preferably less than about 5 mm. For example, the shaft 14 may be displaced from the rotation axis A along the offset portion 15 in an amount greater than 0.0 mm to about 7 mm, preferably from about 0.05 mm to about 6 mm, and more preferably from about 0.5 mm to about 5 mm.

It is further appreciated that at least about 10%, preferably at least about 25%, and more preferably at least about 50% of the shaft 14 (e.g., along one or more longitudinal portions of the shaft between the proximal end and the tip) may be continually displaced radially from the rotation axis A. Furthermore, it is appreciated that less than about 100%, preferably less than about 95%, and more preferably less than about 90% of the shaft 14 (e.g., along one or more longitudinal portions of the shaft between the proximal end and the tip) may be continually displaced radially from the rotation axis A. For example, from about 10% to about 100%, preferably from about 25% to about 95%, and more preferably from about 5% to about 90% of the shaft 142 (e.g., along one or more longitudinal portions of the shaft between the proximal end and the tip) may be continually displaced radially from the rotation axis A.

The dental instrument 10 may be formed of a metal, a plastic or may be a composite. Furthermore, the dental instrument 10 may include metal portions, plastic portions composite portions and/or combinations thereof. Portions of the dental instrument 10 may be hollow or solid. In one specific embodiment the entire dental instrument 10 may be solid and made from plastic. In another specific embodiment, the shaft 14 may be plastic while the connection 12 may be metal.

In one particular embodiment shown in FIG. 1, the dental instrument 10 may be an irrigator with a 2D S-shaped curve in X-Y plane. This irrigator 10 may be formed with a predetermined shaped/curved condition at rest. Desirably the instrument 10 is flexible and may be compressible from the predetermined shape/curved condition at rest to a straight or substantially straight condition while being utilized in the root canal cavity as portions of the shaft 14 extends into the cavity of the root canal its width radially decreases. At different axial lengths of the canal, the irrigator may be at different diameters of compression to maximize contact with the outer wall of the root canal cavity.

In a specific embodiment, the end portion near the tip 18 of the instrument 10 may be tapered similar to the taper of the canal after being shaped by tapered instruments such as a dental file.

In another specific embodiment, the irrigator 10 may be non-tapered and generally straight the entire length of the shaft 14. It is appreciated that a non-tapered portion of the shaft 14 near the tip 18 may still have the capability of touching the root canal walls due to its spring constant that flexes it to its original shape unless the root canal size or shape is smaller and it then compresses to that root canal size and shape.

Some root canals may include pockets and/or areas distally that are circumferentially larger than a more proximal location within the canal, which radially expands or compresses portions of the instrument 10 relative to the width of the root canal cavity.

Figure 2:
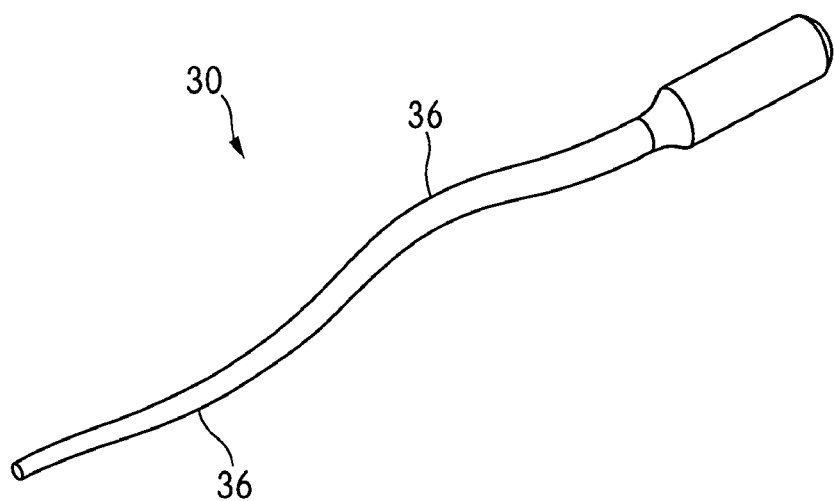
FIG. 2 is a perspective view of a second embodiment of the present invention having shallower curves than the first embodiment shown in FIG. 1.

During rotation or counter-rotation this curved shaft helps sweep irrigant fluid within the canal to the surface of the canal wall in order to help facilitate the removal of biofilm, the smear layer, debris and calcified deposits and help mechanically remove that material FIG. 2 shows an instrument 30 with shallower curves 36 than instrument 10 shown in FIG. 1, but still 2D in the X-Y plane. This may be a result from the different materials that are available for use in the irrigator or an example of the variety of shapes and sizes that might be made so the clinician can choose the appropriate one for the tooth and canal in treatment.

Figure 3:
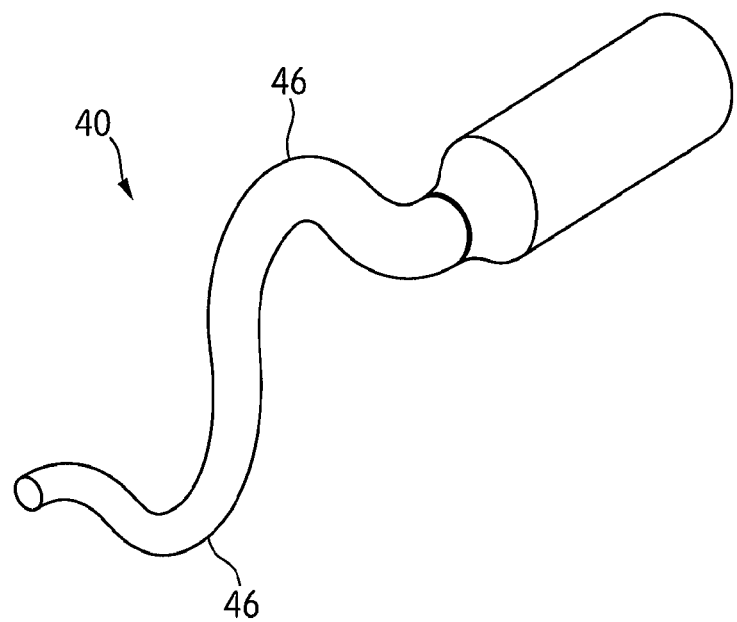
FIG. 3 is a perspective view of a third embodiment of the present invention having sharper/deeper curves than the first embodiment shown in FIG. 1.

FIG. 3 shows an instrument 40 with a sharper and deeper curves than the instrument 10 shown in FIG. 1, but still 2D in the X-Y plane. For some large teeth or root canals, a larger curve may be necessary due to the large diameter in the coronal third of the canal.

Figure 4:
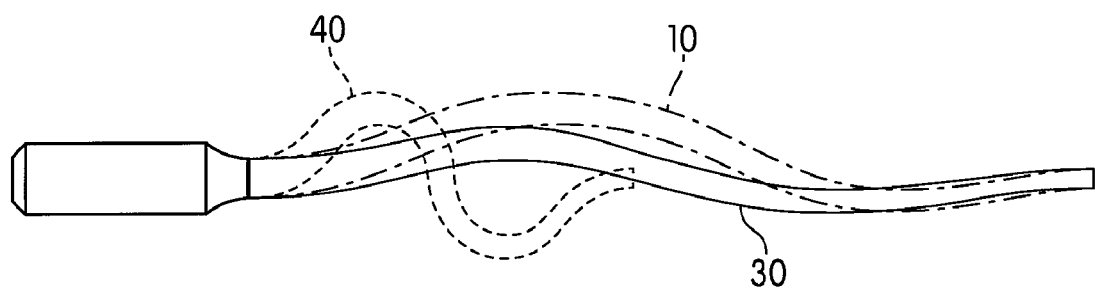
FIG. 4 is a top view of an overlay of the embodiments shown FIGS. 1-3.

FIG. 4 provides an overlay of the instruments 10, 30, and 40 to indicate the variation in shapes and curves that may be used in the present invention. However, it is appreciated that any one of instruments 10, 30, and 40 may be compressed during use to achieve similar radial widths W to maximize contact with the outer wall of the root canal cavity. For the purposes of the 2D instrument embodiments, the radial width W may be defined as the distance from the axis of rotation A to the outer most radial edge of the shaft (as shown in FIG. 1).

Figure 5:
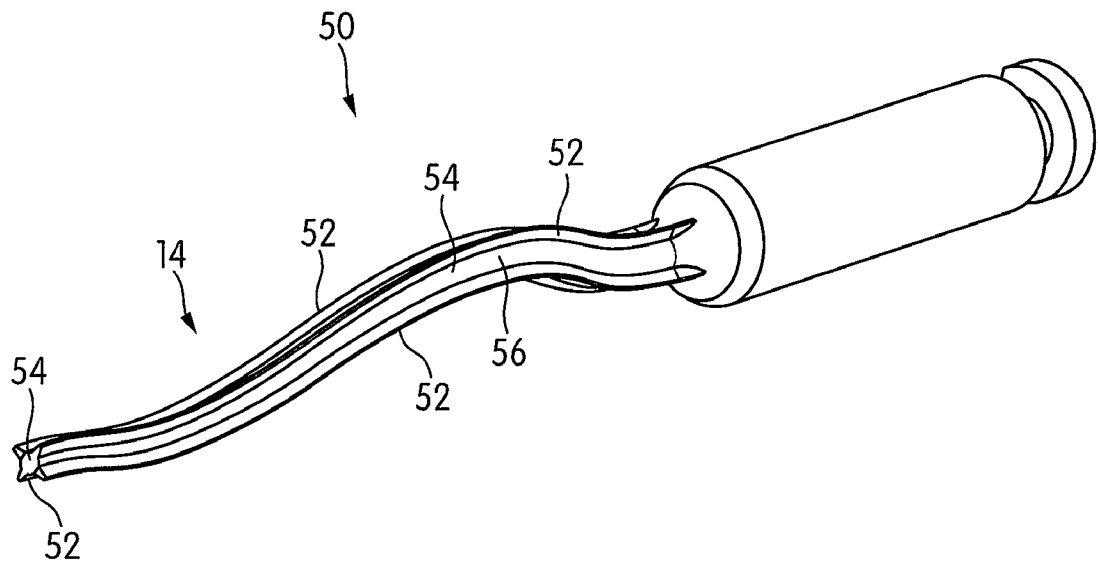
FIG. 5 is a perspective view of a fourth embodiment of the present invention having a radially extending protrusions.

The present invention may further include at least one radial protrusion extending along at least a portion of the shaft. When included, at least one groove may be provided between multiple radial protrusions along the length of the shaft. FIG. 5 shows an instrument 50 having four radial protrusions 52 extending radially from the core 54 and longitudinally along the length of the shaft 14. The four radial protrusions being separated by four grooves 56.

Figure 6:
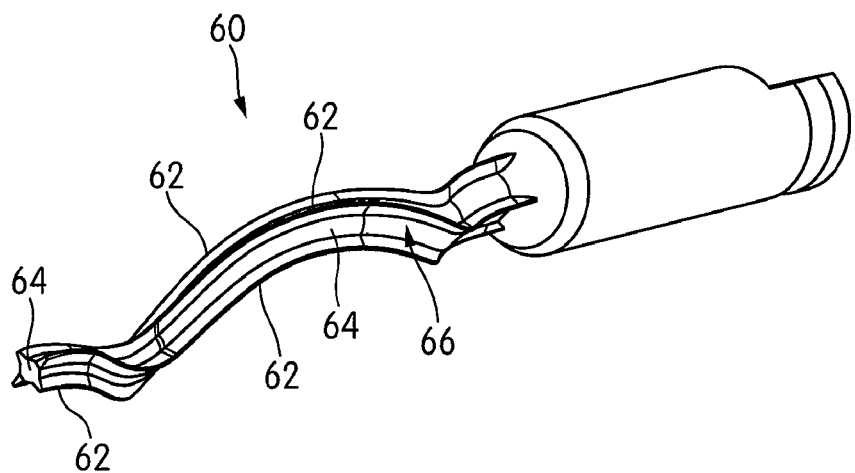
FIG. 6 is a perspective view of a fifth embodiment of the present invention having angled radially extending protrusions.

In another embodiment, FIG. 6 shows an instrument 60 having angled protrusions 62, radially extending from the core 64 of the shaft 14. The angled protrusions 62 being separated by grooves 66 along the shaft 14. During rotation or counter-rotation these protrusions can help force the irrigant fluid to the surface of the canal wall as well as channel the irrigant fluid axially between the protrusions at high velocities as the protrusions "squeegee" the fluid against the canal wall. This squeegee action can increase the shear stress of the fluid against the wall in both circumferential and axial directions to help remove the biofilm and smear layer that remains after shaping.

Figure 7:
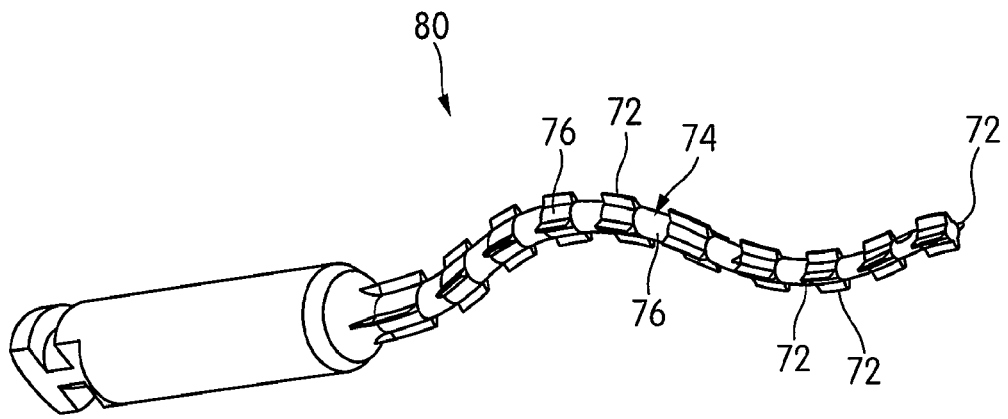
FIG. 7 is a perspective view of a sixth embodiment of the present invention having interrupted radially extending protrusions.

FIG. 7 shows an instrument 70 having four intermittent radial protrusions 72 extending from the core 74 of the shaft 14 with grooves 76 therebetween, One or more protrusions 72 may be interrupted along the length of the shaft 14 by spacings 76. It is appreciated that one or two protrusions 72 may be located only on the inside curve of the irrigator. As explained earlier the protrusions the curved shape of the irrigator directs the irrigant fluid against the inside wall of the root canal and the protrusions can capture and compress this fluid in a dynamic action that increases the velocity of the fluid and resulting shear wall stress at the canal wall. The interrupted protrusions can allow the escaping fluid, from the squeegee action, to move radially as well as axially so that this flow direction and velocity is both dynamic and chaotic to maximize the removal of the biofilm and other material.

Figure 8:
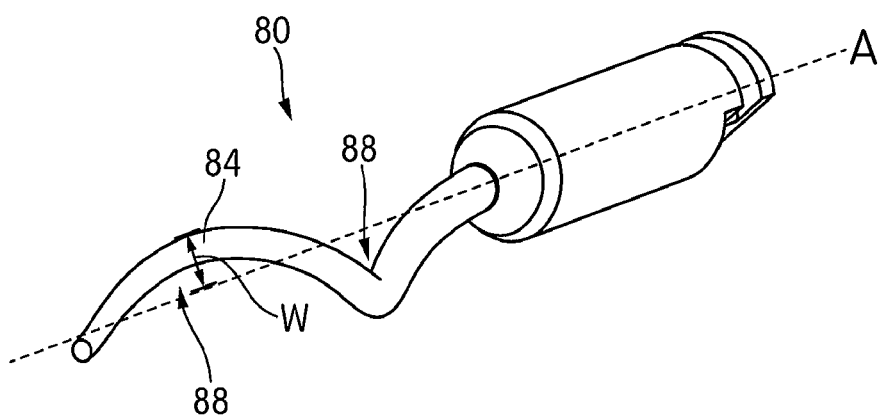
FIG. 8 is a perspective view of a seventh embodiment of the present invention extending along three planes.

In another specific embodiment, FIG. 8 shows a spiral shaped irrigator 80. Whereas the previous figures depicted curved tips in one (X-Y) plane, the spiral instrument 80 occurs in 3D (X-Y-Z planes). In one example, the core 84 spirals about the rotation axis A such that at least two portions 88 of the instrument 80 are offset from the rotation axis A in two different planes (e.g., X-Y plane, Y-Z plane, X-Z plane, etc. . . . ). Various angles of spirals and diameters of the spiral can be envisioned to be appropriate for large, small, and irregular root canals. As for the one (X-Y) plane irrigator, though not shown here, the spiral can be a constant tapered part as well as have various protrusion axially and radially along the part to promote the liquid action and mechanical material removal.

Figure 9:
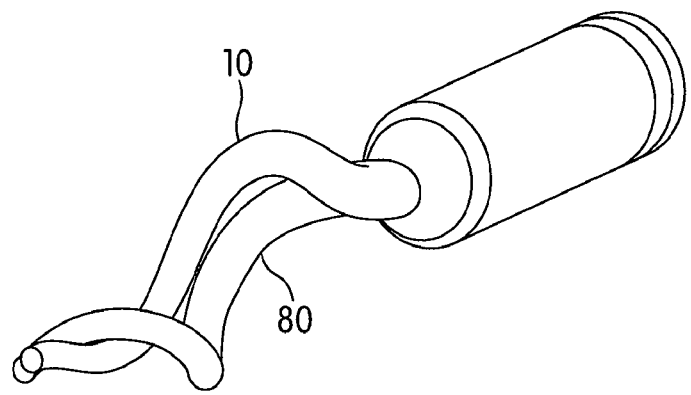
FIG. 9 is a perspective view of an overlay of the embodiments shown FIGS. 1 and 8.

FIG. 9 provides an overlay of the instruments 10 and 80 to indicate the variation in shapes and curves that may be used in the present invention. However, it is appreciated that any one of instruments 10 and 80 may be compressed during use to achieve similar radial widths W to maximize contact with the outer wall of the root canal cavity. For the purposes of the 3D instrument embodiments, the radial width W may be defined as the distance from the two of rotation A to the outer most radial edge of the shaft (as shown in FIG. 8).

Figure 10:
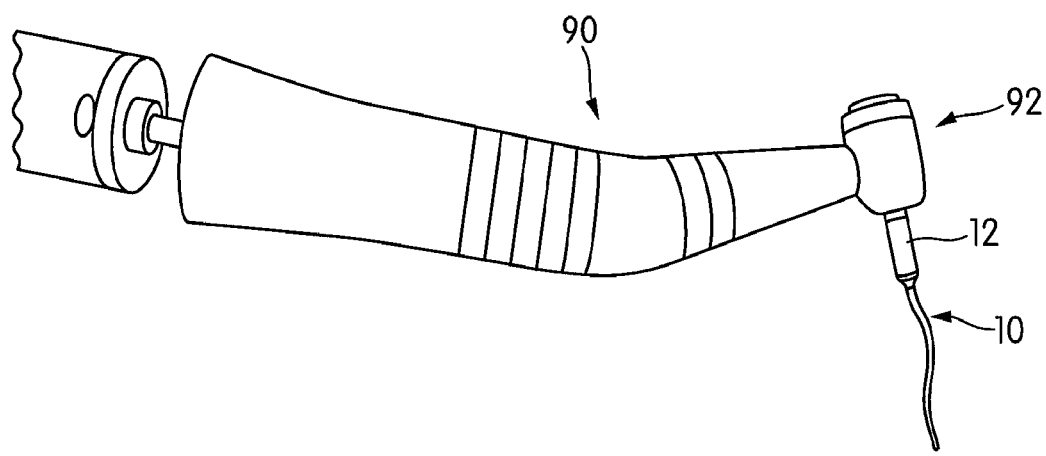
FIG. 10 is a side view of a dental arrangement having a dental handpiece with the first embodiment of the present invention shown in FIG. 1 being installed.
Figure 11:
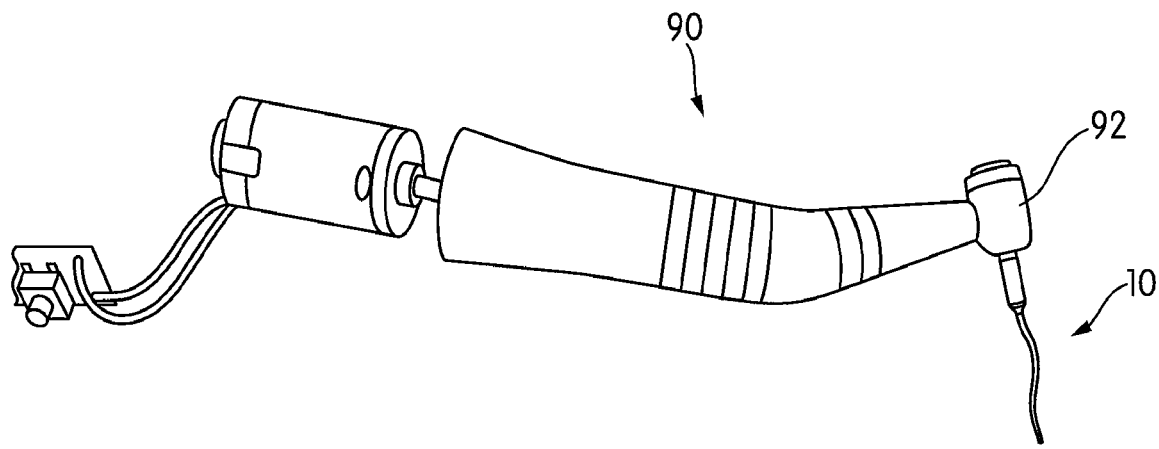
FIG. 11 is a side view of the dental arrangement shown in FIG. 10 during operation of the dental handpiece.
Figure 12:
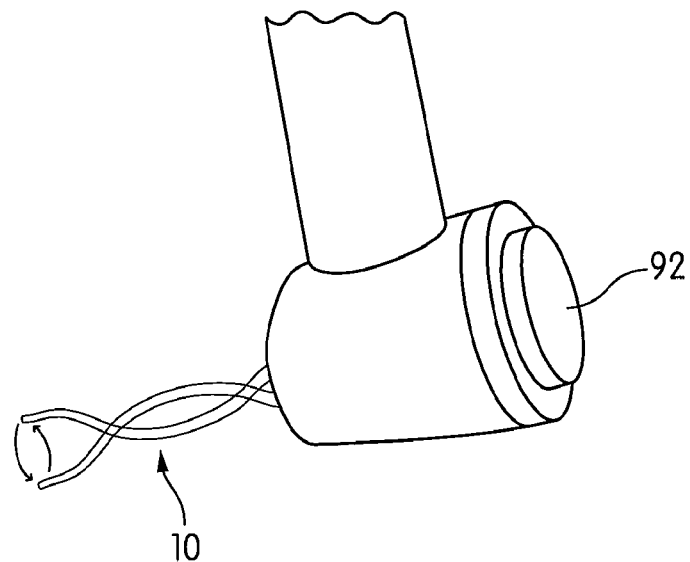
FIG. 12 is a zoomed-in perspective view of the dental arrangement shown in FIG. 11 at ~10,000 rpm.

FIG. 10 shows a one-plane curved instrument 10 in a rotary handpiece 90 The instrument 10 by way of connector 12 is releasably attached to the head 92 of the handpiece 90. In a similar arrangement, FIG. 11 shows instrument 10 from FIGS. 1 and 10 being rotated by handpiece 90 at a speed of ~10,000 rpm. FIG. 11 provides a good representation of how an 2D S-shaped irrigator may be capable of sweeping a large diameter through the 360 degrees of motion of the shaft 14.

Figure 13:
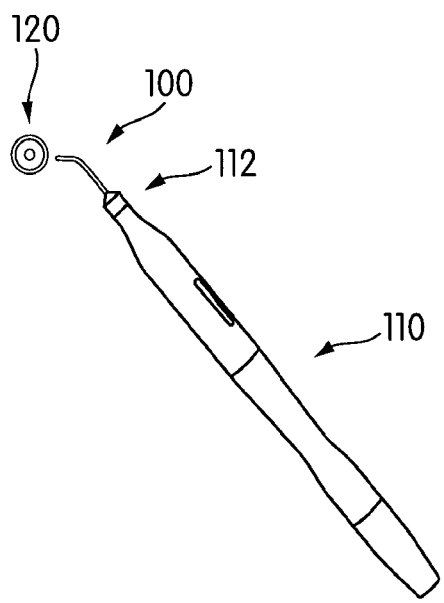
FIG. 13 is a perspective view of an eighth embodiment of the present invention having an integrated laser.

In another embodiment, the present invention may include an integrated light and/or laser. When included, the instrument 100 may include a hollow pathway extending through the shaft 114. The integrated light/laser may be located in the head of the handpiece, the handpiece itself, in the connector and/or in the shaft 114. As shown in FIG. 13, an example handpiece 110 is provided with an integrated red laser 116 having light 120 exiting from the tip of the instrument 100.

In another specific exemplary embodiment, the present invention may include a system comprising a hand held apparatus for use in cleaning and disinfecting teeth root canals used to rotate a tip either in rotational, reciprocating, and vertical motion or any combination thereof preferably at a rotational speed between 5,000 to 60,000 rpm to drive a tip in order to clean or support cleaning and disinfecting the root canal.

The system may include one or more of the following features and/or combinations thereof: a proximal portion for attaching the irrigator; mechanical gearing to drive the irrigator in a rotary motion, in a vertical motion, in reciprocating motion in either both rotating or vertical motions; mechanics and control for continuous, reciprocating, or pulsing rotary or vertical motion; power from electrical means, such as disposable, rechargeable batteries, or compressed air; rotating power from either pressurized air or from the above mentioned electrical power sources; excitation light such as white, red, UV, or blue for either visual enhancement or photo dynamic cleaning, the light being delivered: through the head of the apparatus into the irrigator so that the light enters the canal; through the head of the apparatus so the light enters the bottom of the tooth pupal floor; from the side or the head of the apparatus so the light enters the side of the tooth; ability to deliver irrigant from the system to the canal; tip can have channels used to facilitate the delivery of the irrigant within the canal; apparatus can have a tank with a method of delivering irrigant into the canal via the handpiece; and any combination thereof.

In yet another specific exemplary embodiment, the present invention may include an irrigator design comprising an irrigator for use with the apparatus to be used in the cleaning and disinfecting of tooth root canals.

The irrigator may be designed to include one or more of the following features: a connector so that the proximal end attaches to the apparatus; a shaft having a flexible core so that the diameter may be constant and can reach within 2 mm of the apex of the root canal with a diameter from 1 mm for large canals to as small as 0.2 mm for small canals; a pre-set (shape-set) curved profile that can clean the walls of large canals, these curves being sometimes in one plane with a S as an example and sometimes in two planes with a spiral as an example; with various cross-sectional shapes such as round, square or rectangular; with flexible materials that allow the curved profile to compress to a smaller local diameter and conform to the shape of many non-circular canals; with tabs or protrusions along the shaft of the irrigator in various configurations; with tabs or protrusions along the shaft of the irrigator in an alternating or interrupted pattern to direct and disrupt the irrigant fluid flow into higher velocity and chaotic flow to improve canal cleaning; with these tabs or protrusions along the shaft only on the inside of the irrigator curve; tips with shapes with protrusions/tabs/fins on the inside of the shaped tip; with materials that allow light from a source such as a diode or laser to be coupled into the proximal end of the irrigator, be transmitted through the irrigator and released along the length and end of the irrigator; with an inlet port and lumen so that irrigation and cleaning fluids can be dispensed into the canal while the irrigator is in the canal or being activated in the canal; and any combination thereof.

The invention claimed is:

1. A dental instrument for use with a dental handpiece for cleaning and disinfecting of tooth root canals, the instrument including: a shaft and connector for releasable attachment to the handpiece, the shaft comprising:
   a flexible core having a surface, the core having a longitudinal axis about which the shaft is rotatable at or above 5000 RPM by the handpiece, the core having at least one curve along the longitudinal axis such that the core comprises one or more offset portions that are offset from the longitudinal axis such that the shaft has a predetermined shaped curved condition at rest, wherein the one or more offset portions, collectively, comprise between 5% and 90% of a total length of the shaft;
   a tip end;
   a distal portion approximate to the connector; and
   at least two radial protrusions extending along a length of the shaft with a longitudinal groove extending therebetween, the radial protrusions extending from the surface of the core to a free end, wherein the radial protrusions come to a tip at the free end in a "V" shape, wherein a material of the shaft comprises a light transmissive material such that light is routable into the distal portion of the shaft and travels through the shaft and exits through the surface of the material into the root canal.

2. The dental instrument of claim 1, wherein at least one of the at least two radial protrusions taper towards the free end.

3. The dental instrument of claim 1, wherein the at least two radial protrusions have a length extending between the surface of the core and the free end ranging from about 0.01 mm to about 2 mm.

4. The dental instrument of claim 1, wherein the at least two radial protrusions have a length extending between the surface of the core and the free end that varies along the length of the shaft.

5. The dental instrument of claim 1, wherein the at least two radial protrusions is at least four radial protrusions.

6. The dental instrument of claim 1, wherein the curved shaped condition at rest comprises at least two offset portions in the shaft being radially displaced from an axis of rotation.

7. The dental instrument of claim 6, wherein the at least two offset portion are radially displaced from the axis of rotation about one plane.

8. The dental instrument of claim 6, wherein the at least two offset portion are radially displaced from the axis of rotation about at least two planes.

9. The dental instrument of claim 1, wherein the shaft is hollow and includes an internal pathway extending from the tip end to the distal portion of the shaft.

10. The dental instrument of claim 1, wherein the shaft further comprises a flexible, compressible and expandable material, such that the shaft is transitionable between a curved shape and a substantially straight shape.

11. The dental instrument of claim 1, wherein the light transmissive material comprises a fiber optic cable.

\* \* \* \* \*